R. M. LAFFERTY.
COMBINED COVER LIFTER, HAMMER, &c.
No. 65,397. Patented June 4, 1867.
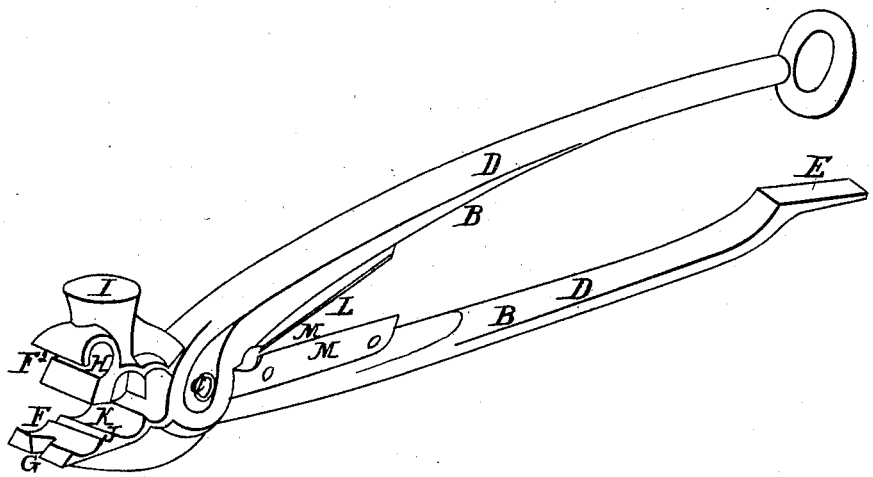
Witnesses.
Inventor.

United States Patent Office.

R. M. LAFFERTY, OF THREE RIVERS, MICHIGAN, ASSIGNOR TO HIMSELF AND J. E. AND J. P. PRUTZMAN

Letters Patent No. 65,397, dated June 4, 1867.

COMBINED COVER-LIFTER, HAMMER, &c., &c.

*The Schedule referred to in these Letters Patent and making part of the same.*

TO ALL WHOM IT MAY CONCERN:

Be it known that I, R. M. LAFFERTY, of Three Rivers, in the county of St. Joseph, and State of Michigan, have invented a new and improved Combination Implement; and I do hereby declare that the following is a full, clear, and exact description thereof, which will enable others skilled in the art to make and use the same, reference being had to the accompanying drawings, forming part of this specification.

The combination implement embraced in the present invention consists of a stove-cover hook or lifter, a lifter for kettles and other vessels or dishes having a bail-handle, a hammer, a tack-extractor or drawer, a screw-driver, a knife-sharpener, a pair of pincers, and a wire-cutter. In the accompanying plate of drawings, my improved combination implement is illustrated, the figure being a perspective view of the implement in the direction of its length.

A, in the drawings, represents my improved combination implement. This implement is formed of two levers or arms, B, pivoted together at C, so as to open from and close upon each other in a manner similar to a pair of scissors, shears, pliers, &c. D is the handle portion to the arms B, one of which handles at its outer end terminates in a screw-driver, E; $F$ $F^2$ the jaws to the implement or arms B, one, F, of which jaws is longer than the other, $F^2$, and has a notch, G, on its outer end, by means of which a tack or nail can be extracted or drawn. The other jaw, $F^2$, at its outer end, is provided with a hook, H, which constitutes the lifter for the covers to stoves, ranges, &c., and to the outside of this jaw $F^2$ is attached a hammer-head, I. The inner surface of the jaw F is corrugated across its width, one, J, of which corrugations, in connection with the extension-piece K to the upper or other jaw, $F^2$, constitutes and forms the pincers, the two jaws, when brought and held together, producing a lifter for kettles, and articles having bail-handles more particularly. To each of the handle portions of the arms B, upon their inside, is secured a sharpening plate, L, with their sharpening edges M toward each other, so that when they are brought together forming, by their sharpening edges, an angle with each other, by then simply drawing a knife-blade in and between the two, such blade can be sharpened as desired.

I claim as new, and desire to secure by Letters Patent—

The combination of the screw-driver E, tack-drawer G, lifter H, hammer-head I, the corrugation J of the jaw F, engaging with the extension-piece K to form pincers, knife-sharpening plate L, in one implement, constructed as herein described.

R. M. LAFFERTY.

Witnesses:
A. W. SNYDER,
L. COLLISI.